United States Patent [19]
Gawlik

[11] Patent Number: 5,537,340
[45] Date of Patent: Jul. 16, 1996

[54] METHOD FOR CANCELLATION OF ERROR BETWEEN DIGITAL ELECTRONICS AND A NON-RATIOMETRIC SENSOR

[75] Inventor: Mark E. Gawlik, Sterling Heights, Mich.

[73] Assignee: Chrysler Corporation, Auburn Hills, Mich.

[21] Appl. No.: 497,105

[22] Filed: Jun. 30, 1995

Related U.S. Application Data

[63] Continuation of Ser. No. 932,468, Aug. 20, 1992, abandoned.

[51] Int. Cl.⁶ .................................................. G01R 17/04
[52] U.S. Cl. ...................................... 364/571.05; 364/483
[58] Field of Search ......................... 364/571.01–571.05, 364/480, 481, 483; 341/118, 120; 307/10.1

[56] References Cited

U.S. PATENT DOCUMENTS

| | | | |
|---|---|---|---|
| 4,198,677 | 4/1980 | Brunner et al. | 364/571.04 |
| 4,439,831 | 3/1984 | Sinclair | 364/571.03 |
| 4,481,596 | 11/1984 | Townzen | 364/571.05 |
| 4,800,513 | 1/1989 | Deutsch | 364/571.02 |
| 4,849,892 | 7/1989 | McCombie | 364/426.04 |
| 4,860,210 | 8/1989 | McCombie | 364/426.04 |
| 4,896,282 | 1/1990 | Orwell | 364/571.05 |
| 4,901,561 | 2/1990 | Glowczewski | 73/118.1 |
| 4,930,095 | 5/1990 | Yuchi et al. | 364/571.01 |
| 4,933,633 | 6/1990 | Allgood | 364/483 |
| 5,012,442 | 4/1991 | McCambridge | 395/575 |
| 5,040,178 | 8/1991 | Lindsay et al. | 371/21.5 |
| 5,125,089 | 6/1992 | McCambridge | 395/500 |
| 5,151,647 | 9/1992 | Frantz | 322/99 |
| 5,172,115 | 12/1992 | Kerth et al. | 341/118 |

*Primary Examiner*—Ellis B. Ramirez
*Assistant Examiner*—Kyle J. Choi
*Attorney, Agent, or Firm*—Mark P. Calcaterra

[57] ABSTRACT

A method is provided for cancellation of error between digital electronics and a non-ratiometric sensor. The method includes the steps of reading a voltage from a non-ratiometric sensor by digital electronics on a periodic basis for a predetermined time period, determining whether the voltage reading is between a predetermined range, and calculating a calibration (CAL) value based on the voltage reading if the voltage reading is between the predetermined range. The method also includes the steps of ending the previous steps when the predetermined time period has elapsed. The method further includes the steps of delaying for another predetermined time period after the step of ending and adjusting subsequent voltage readings from the non-ratiometric sensor based on the CAL value.

10 Claims, 2 Drawing Sheets

METHOD FOR CANCELLATION OF ERROR BETWEEN DIGITAL ELECTRONICS AND A NON-RATIOMETRIC SENSOR

This is a continuation of U.S. patent application Ser. No. 07/932,468, filed Aug. 20, 1992, abandoned.

BACKGROUND OF THE INVENTION

1. Field of the Invention

The present invention relates generally to non-ratiometric sensors, and more particularly to, a method for cancellation of error between digital electronics and a non-ratiometric sensor.

2. Description of the Related Art

A ratiometric sensor is typically referred to as a sensor that shares the same voltage source and ground that is used by an analog to digital converter that is monitoring it. As a result, any error that might occur in the reading of the sensor by the analog to digital converter due to differences in voltage across both devices is eliminated.

However, a sensor that cannot share the same voltage source as the analog to digital converter is typically called non-ratiometric. As a result, the readings of the sensor by the analog to digital converter are susceptible to differences in the voltage source used by each device.

An example of a non-ratiometric sensor used in automotive applications is a methanol content sensor. The methanol content sensor includes a microprocessor to provide methanol content information of fuel used by an engine in an automotive vehicle. However, one disadvantage is that the methanol content sensor is non-ratiometric to the analog to digital converter of an engine controller monitoring the sensor. That is, since the methanol content sensor is not powered by the engine controller's voltage source, there could be error when the engine controller reads the methanol content sensor's signal voltage due to the tolerances or differences of each device's voltage source. Therefore, there is a need in the art to cancel this error.

SUMMARY OF THE INVENTION

It is, therefore, one object of the present invention to provide a method for cancellation of error between digital electronics and a non-ratiometric sensor.

It is another object of the present invention to provide a method for cancellation of error when interfacing an analog to digital converter with a non-ratiometric sensor.

It is yet another object of the present invention to provide a method for cancellation of error between an engine controller and a methanol content sensor.

To achieve the foregoing objects, the present invention is a method for cancellation of error between a digital electronic device and a non-ratiometric sensor. The method includes the steps of reading a voltage from a non-ratiometric sensor by a digital electronic device on a periodic basis for a predetermined time period. The method also includes the steps of determining whether the voltage reading is within a predetermined range and calculating a calibration value based on the voltage reading if the voltage reading is between the predetermined range. The method includes the steps of ending the previous steps when the predetermined time period has elapsed. The method further includes the steps of delaying for another predetermined time period and adjusting subsequent voltage readings of the sensor based on the calibration value.

One advantage of the present invention is that a method is provided for canceling error when interfacing digital electronics to a non-ratiometric sensor. Another advantage of the present invention is that the error between a non-ratiometric methanol content sensor and the analog to digital converter of an engine controller is eliminated.

Other objects, features and advantages of the present invention will be readily appreciated as the same becomes better understood after reading the following description taken in conjunction with the accompanying drawings.

DESCRIPTION OF THE PREFERRED EMBODIMENT(S)

Figure 1:
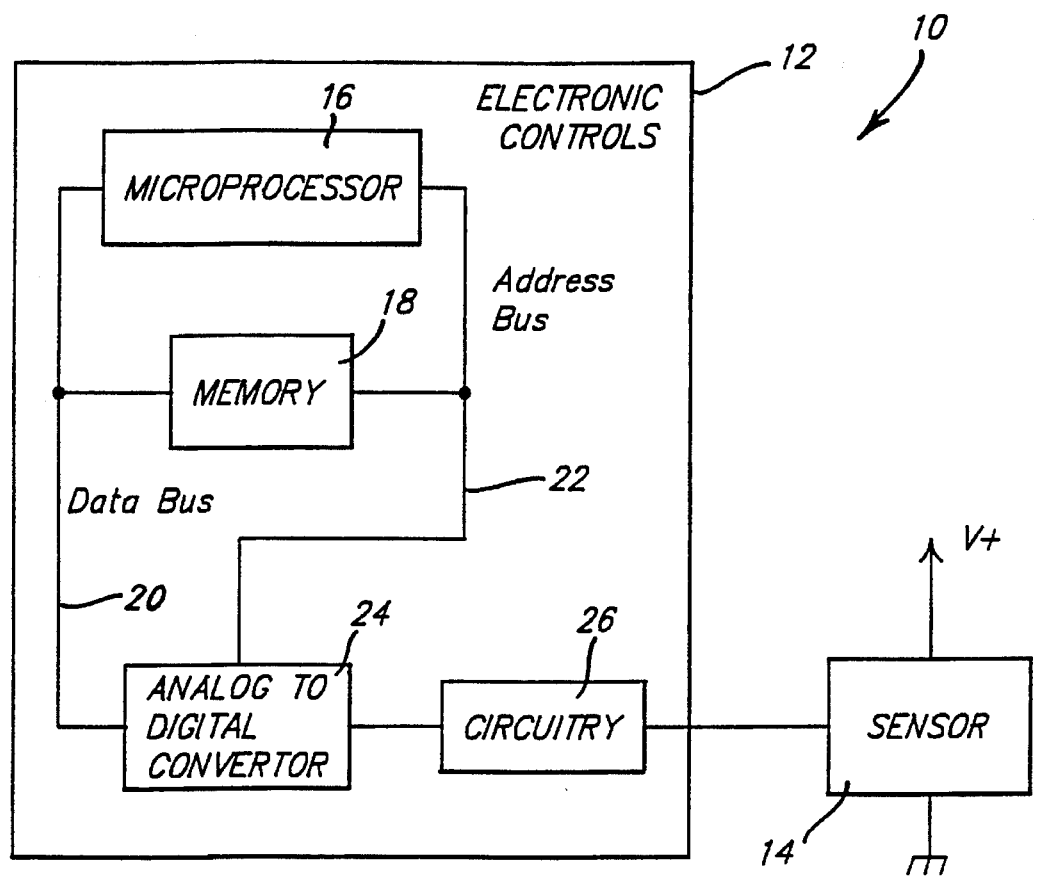
FIG. 1 is a schematic diagram of a hardware system used with a method for cancellation of error between digital electronics and a non-ratiometric sensor according to the present invention.

Referring to FIG. 1, a hardware system 10 for carrying out a method for cancellation of error between digital electronics and a non-ratiometric sensor, according to the present invention, is shown. The system 10 is used with a vehicle (not shown) such as an automotive vehicle having an engine (not shown). The system 10 includes an engine controller or Electronic Control Unit 12 which communicates with a non-ratiometric sensor 14 such as a methanol content sensor. It should be appreciated that the methanol content sensor 14 has a microprocessor for providing information of methanol content of fuel used by the engine as is known in the art.

The electronic control unit 12 includes a Micro Processing Unit 16, memory 18, data bus 20, address bus 22, an analog to digital converter 24, and other circuitry 26. The analog to digital converter 24 is electrically connected to the sensor 14 via the circuitry 26. The electronic control unit 12 is powered by a voltage source (not shown) such as a 5 volt regulator. The sensor 14 is also powered by another voltage source (not shown) such as a 5 volt regulator. It should be appreciated that the system 10 may include other hardware to carry out the method to be described.

Figure 2:
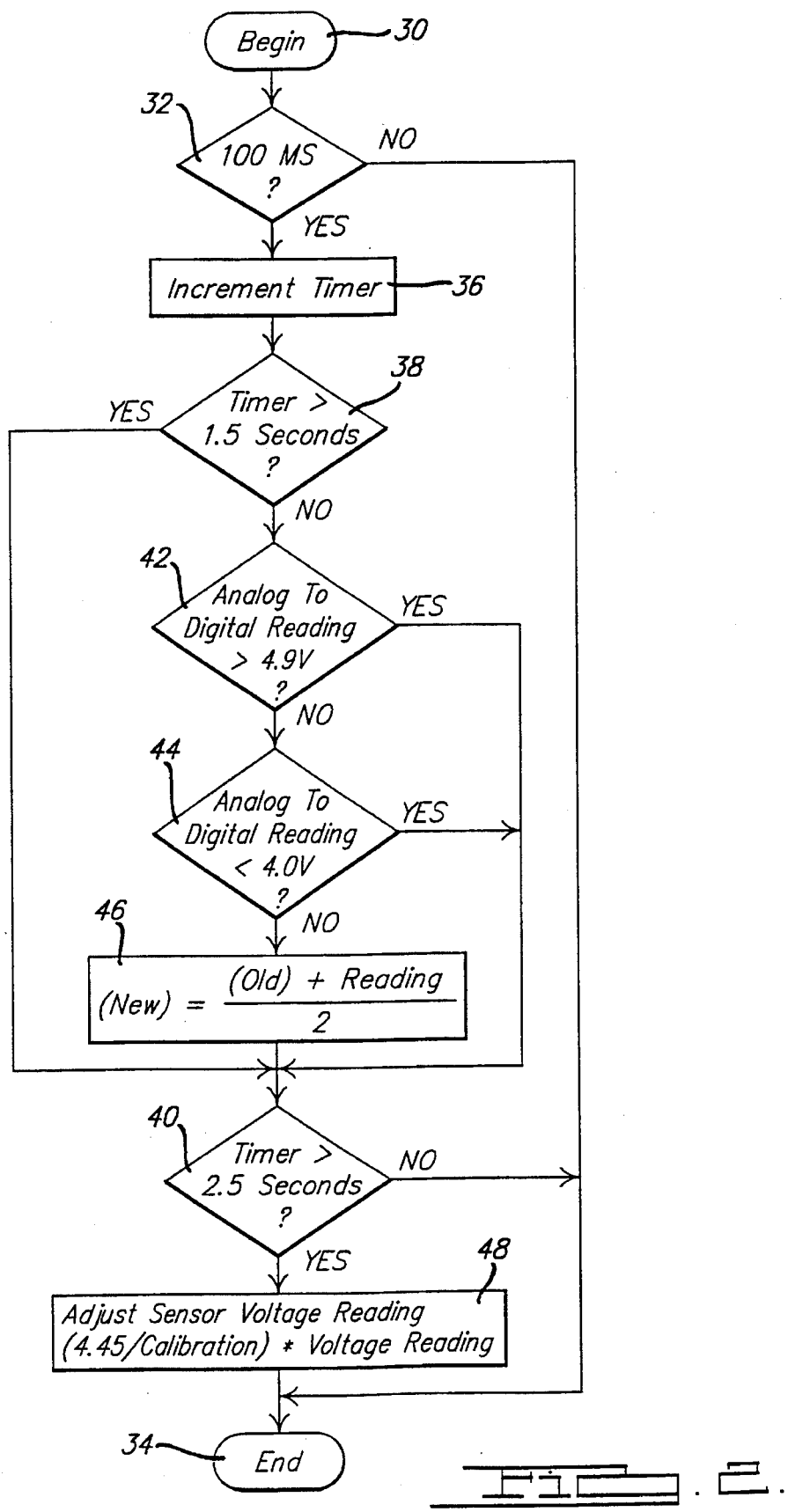
FIG. 2 is a flowchart of a method for cancellation of error between digital electronics and a non-ratiometric sensor according to the present invention.

Referring to FIG. 2, a flowchart of a method for cancellation of error between digital electronics, such as the analog to digital converter 24 of the electronic control unit 12, and a non-ratiometric sensor, such as the methanol content 14, according to the present invention is shown. Upon power-up or key-on which corresponds to zero seconds, the sensor 14 sends out a calibration voltage signal to the electronic control unit 12 between a predetermined voltage range such as zero (0) to five (5) volts for a predetermined time period such as two (2) seconds. The calibration voltage signal corresponding to a methanol content calibration has a predetermined value or voltage such as 4.45 volts. Upon power-up, the electronic control unit 12 will not normally initialize a methanol content RAM location in memory 18 for the calibration value. If RAM memory has been lost (e.g., due to battery disconnect, etc.), the routine or methodology will initialize the methanol content RAM location in memory 18 with a calibration value such as 4.45 volts. After the predetermined time period, the sensor 14 will send out a voltage signal corresponding to the methanol content of the fuel it is monitoring.

Upon power-up, the methodology begins or starts in block 30 and advances to diamond 32. In diamond 32, the methodology reads the sensor 14 on a periodic basis such as every one hundred milliseconds (100 ms). This is accomplished by the analog to digital converter 24 reading the voltage signal from the sensor 14. If one hundred milliseconds have not elapsed, the methodology advances to block 34 and ends the routine. If one hundred milliseconds has elapsed, the methodology advances to block 36 and increments a timer (not shown) in the electronic control unit 12 to a predetermined amount such as 100 ms. The methodology then advances to diamond 38 and determines whether the count or time on the timer is greater than a predetermined value such as 1.5 seconds. If so, the methodology advances to diamond 40 to be described and no change is made to the calibration value that is stored in memory 18.

If the time on the timer is not greater than 1.5 seconds, the methodology advances to diamond 42 and determines whether the ADC reading is greater than a first predetermined value such as 4.9 volts. If so, the methodology advances to diamond 40 to be described. If not, the methodology advances to diamond 44 and determines whether the analog to digital converter reading is less than a second predetermined value such as 4.0 volts. If so, the methodology advances to diamond 40 to be described and no change is made to the calibration value stored in memory 18 because the actual voltage reading of the sensor 14 is not between the first and second predetermined values.

If the analog to digital converter reading is not less than the second predetermined value, the methodology advances to block 46 and averages analog to digital converter readings. In block 46, the methodology updates the methanol contentRAM location for the calibration value stored in memory 18. The methodology calculates a new calibration value based on the old or previous calibration value plus the actual voltage or analog to digital converter reading of the sensor 14, the summation of which is divided by two. The new calibration value is then stored in the methanol content RAM location in memory 18. The methodology then advances to diamond 40 to be described. It should be appreciated that the computation in block 46 is repeated approximately once every 100 ms until 1.5 seconds after power-up has elapsed.

In diamond 40, the methodology determines whether the time on the timer is greater than a predetermined value such as 2.5 seconds. The methodology waits an additional one (1) second after 1.5 seconds has elapsed before it makes use of the methanol content voltage to guarantee that there is no chance that the electronic control unit 12 will inadvertently interpret the calibration voltage as a methanol content voltage. If the time on the timer is not greater than 2.5 seconds, the methodology advances to block 34 and ends. If the time on the timer is greater than 2.5 seconds, the methodology advances to block 48 and adjusts the sensor voltage or analog to digital converter reading. The analog to digital converter reading is adjusted by taking a predetermined value such as 4.45 volts and dividing it by the calibration value and multiplying that ratio by the current analog to digital converter reading. As a result, all voltages from the sensor 14 and read by the analog to digital converter 24 will be multiplied by the term (4.45/calibration). This will allow the electronic control unit 12 to adjust all subsequent analog to digital converter readings based on the calibration value. The adjustment allows the electronic control unit 12 to eliminate any error due to differences in each devices voltage sources to provide more accurate information from the sensor 14. The methodology then advances to block 34 and ends.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for cancellation of error between a digital electronic control unit and a non-ratiometric sensor, said method comprising the steps of:

electronically connecting the non-ratiometric sensor to the digital electronic control unit;

reading a first voltage signal from the non-ratiometric sensor by the digital electronic control unit on a periodic basis for a predetermined time period;

comparing the first voltage signal to a predetermined range of voltages;

determining by the electronic control unit whether the first voltage signal is between the predetermined range of voltages;

calculating by the electronic control unit a calibration value based on the first voltage signal if the first voltage signal is between the predetermined range of voltages;

measuring a second voltage signal from the non-ratiometric sensor subsequent to the expiration of the predetermined time period; and adjusting the second voltage signal using the calculated calibration value such that the electronic control unit operates on adjusted voltage readings indicative of actual voltage readings from the non-ratiometric sensor.

2. A method as set forth in claim 1 wherein said step of determining comprises determining whether the first voltage signal is greater than a first predetermined voltage and less than a second predetermined voltage.

3. A method as set forth in claim 1 wherein said step of calculating comprises calculating a new calibration value according to the following formula:

$$CAL(NEW) = \frac{CAL(OLD) + VOLTAGE\ READING(CURRENT)}{2}.$$

4. A method step as set forth in claim 1 wherein said step of adjusting comprises multiplying the second voltage signal by a predetermined value divided by the calibration value.

5. A method for cancellation of error between an analog to digital converter of an electronic control unit and a non-ratiometric sensor, said method comprising the steps of:

electronically connecting the non-ratiometric sensor to the analog to digital converter of the electronic control unit;

reading a first voltage signal from the non-ratiometric sensor by the electronic control unit on a periodic time basis;

determining by the electronic control unit whether a first predetermined time period has expired based on the periodic time basis;

determining by the electronic control unit whether the first voltage signal is greater than a first predetermined voltage and less than a second predetermined voltage if the first predetermined time period has not expired;

calculating by the electronic control unit a calibration value based on the first voltage signal if the first voltage signal is not greater than the first predetermined voltage and not less than the second predetermined voltage;

delaying a second predetermined time period if the first predetermined time period has expired;

measuring a second voltage signal from the non-ratiometric sensor; and adjusting the second voltage signal using the calculated calibration value such that the electronic control unit operates on adjusted subsequent voltage readings indicate of actual voltage readings from the non-ratiometric sensor.

6. A method as set forth in claim 5 wherein said step of calculating comprises calculating a new CAL value according to the following formula:

$$CAL(NEW) = \frac{CAL(OLD) + VOLTAGE\ READING(CURRENT)}{2}.$$

7. A method as set forth in claim 5 wherein said step of adjusting comprises multiplying the voltage reading by a predetermined value divided by the CAL value.

8. A method for cancellation of error between an analog to digital converter of an engine controller and a non-ratiometric methanol content Sensor, said method comprising the steps of:

electronically connecting a non-ratiometric methanol content sensor to the analog to digital converter of the engine controller;

reading a first voltage signal from the methanol content sensor by the engine controller on a periodic time basis;

determining by the engine controller whether a first predetermined time period has expired based on the periodic time basis;

determining by the engine controller whether the first voltage signal is greater than a first predetermined voltage and less than a second predetermined voltage if the first predetermined time period has not expired;

calculating by the engine controller a calibration value based on the first voltage signal if the first voltage signal is not greater than the first predetermined voltage and not less than the second predetermined voltage;

delaying a second predetermined time period if the first predetermined time period has expired;

measuring a second voltage signal from the non-ratiometric methanol content sensor;

adjusting the second voltage signal using the calculated calibration value such that the engine controller operates on adjusted subsequent voltage readings indicative of actual voltage readings from the methanol content sensor.

9. A method as set forth in claim 8 wherein said step of calculating comprises calculating a new CAL value according to the following formula:

$$CAL(NEW) = \frac{CAL(OLD) + VOLTAGE\ READING(CURRENT)}{2}.$$

10. A method as set forth in claim 8 wherein said step of adjusting comprises multiplying the voltage reading by a predetermined value divided by the CAL value.

* * * * *